United States Patent [19]

Dexter

[11] 4,310,110
[45] Jan. 12, 1982

[54] SCUBA TANK HARNESS

[75] Inventor: James T. Dexter, Fullerton, Calif.

[73] Assignee: Under Sea Industries, Inc., Compton, Calif.

[21] Appl. No.: 113,960

[22] Filed: Jan. 21, 1980

[51] Int. Cl.³ .......................... A44B 11/00; A45F 3/08
[52] U.S. Cl. ..................................... 224/246; 24/204;
24/232 R; 224/211; 224/250; 224/901
[58] Field of Search ............... 224/210, 242, 211, 246,
224/214, 262, 250, 258, 191, 901; 248/313;
24/204, 265 H, 237, 236, 265 R, 271, 273, 192,
191, 193, 170, 232 R, 270, 204; 285/409;
220/321; 128/205.22

[56] References Cited

U.S. PATENT DOCUMENTS

| | | | |
|---|---|---|---|
| 290,351 | 12/1883 | Parry | 24/273 |
| 409,779 | 8/1889 | Ferris | 24/193 |
| 766,045 | 7/1904 | Kitchen | 24/232 X |
| 1,185,487 | 5/1916 | Eastman | 285/409 X |
| 1,379,968 | 5/1921 | Cook | 24/232 X |
| 2,441,113 | 5/1948 | Kinzl | 24/271 X |
| 3,033,431 | 5/1962 | Henderson et al. | 224/211 |
| 3,090,260 | 5/1963 | Brooks et al. | 24/271 X |
| 3,127,077 | 3/1964 | Faro | 224/210 |
| 3,191,828 | 6/1965 | Senne | 224/211 |
| 3,357,069 | 12/1967 | Gazeley | 24/232 |
| 4,005,506 | 2/1977 | Moore | 24/204 X |
| 4,005,844 | 2/1977 | Richmond | 248/313 X |
| 4,049,164 | 9/1977 | Sullivan et al. | 224/211 |

FOREIGN PATENT DOCUMENTS 1537268 12/1979 United Kingdom ............... 224/211

Primary Examiner—Allan N. Shoap
Attorney, Agent, or Firm—Flam & Flam

[57] ABSTRACT

Affixed to the back plate on opposite sides of a tank seat are brackets providing loops for detachable connection to hooks. An inelastic fabric web, such as of woven nylon, adjustably threads around a buckle bar on one hook, and returns along the inside of the web for firm attachment by hook and mesh fasteners such as "VEL-CRO". The other end of the web fixedly attaches to a metal loop that cooperates with a high leverage toggle mechanism. The toggle mechanism comprises but two parts, the first being a bar forming a hook detachably coupled to the corresponding back plate bracket, the second being a lever hinged to the bar and providing a recess to receive the loop for over center lock and release of the loop by toggle action.

2 Claims, 2 Drawing Figures

SCUBA TANK HARNESS

FIELD OF INVENTION

This invention relates to scuba diving, and particularly, to a back pack for carrying a compressed air tank.

BACKGROUND OF THE INVENTION

A compressed air tank is both heavy and bulky, but carrying it frees the diver from the restraint of an air line. Efforts have been made to reduce the size and weight of the tank by changes in materials and construction, but successes have been minor. The inescapable size and weight of the compressed air tank has resulted in correspondingly bulky and cumbersome harnesses for carrying them. A molded back plate of a certain design has become quite popular in that it conforms very well to the diver's anatomy, is fairly comfortable and provides a stable arcuate seat for the compressed air tank.

Since the tank represents not only a considerable weight, but also a significant viscous drag, the tank must be made very secure to the back plate. To that end, it has been common to utilize spring steel bands encompassing the tank and anchored at opposite ends to the back plate. U.S. Pat. No. 3,269,129 to Zambrano discloses an old style back plate, steel bands and simple draw screws for locking the tank to the back plate. U.S. Pat. No. 3,174,664 to Hue discloses a quick release mechanism for the steel bands which is complicated and difficult to adjust for air tanks of slightly different diameters. U.S. Pat. No. 3,891,131 to Tabata discloses a quick release mechanism for a single wide steel band that provides some improvement in the adjustments for slightly different sized air tanks. But notably, steel bands have become an accepted necessity for supporting the massive air tanks.

The steel tank bands add significant bulk to the back plate, creating storage problems which may be significant on craft that carry divers and their equipment. Furthermore, the tank bands create certain hazards in handling, since they may cut.

In order to remove an air tank from a steel harnes, the tank must slide through the released band. This operation is cumbersome. Detachable clips for the bands have been proposed, but the spring characteristics of the steel bands simply mean that one cumbersome manipulation is substituted for another.

The primary object of the present invention is to provide a harness for a compressed air tank that uses flexible webbing rather than steel bands, whereby the problems related to steel band harnesses are overcome. A further object of this invention is to provide an improved harness of this character that is simple in operation and construction, and which retains its adjustment so that removal and replacement of compressed air tanks is greatly facilitated. A still further object of this invention is to provide an air tank harness of this character that utilizes a high leverage toggle mechanism of improved design whereby secure attachment of the air tank can be achieved with small effort.

SUMMARY OF INVENTION

In order to accomplish the foregoing objects, I affix to the back plate on opposite sides of the tank seat, brackets providing loops for attachment of hooks. An inelastic fabric web, such as of woven nylon, adjustably threads around a buckle bar on one hook, and returns along the inside of the web for attachment thereto by "VELCRO" elements. The other end of the web fixedly attaches to a metal loop that cooperates with a high leverage toggle mechanism. The toggle mechanism comprises but two parts, the first being a bar providing a hook detachably coupled to the corresponding back plate bracket, and the second being a toggle lever hinged to the bar and providing a recess to receive the metal loop for over center lock and release of the loop by toggle action.

BRIEF DESCRIPTION OF DRAWINGS

A detailed description of the invention will be made with reference to the accompanying drawings wherein like numerals designate corresponding parts in the several figures. These drawings are to scale.

DETAILED DESCRIPTION OF PREFERRED EMBODIMENT

Figure 1:
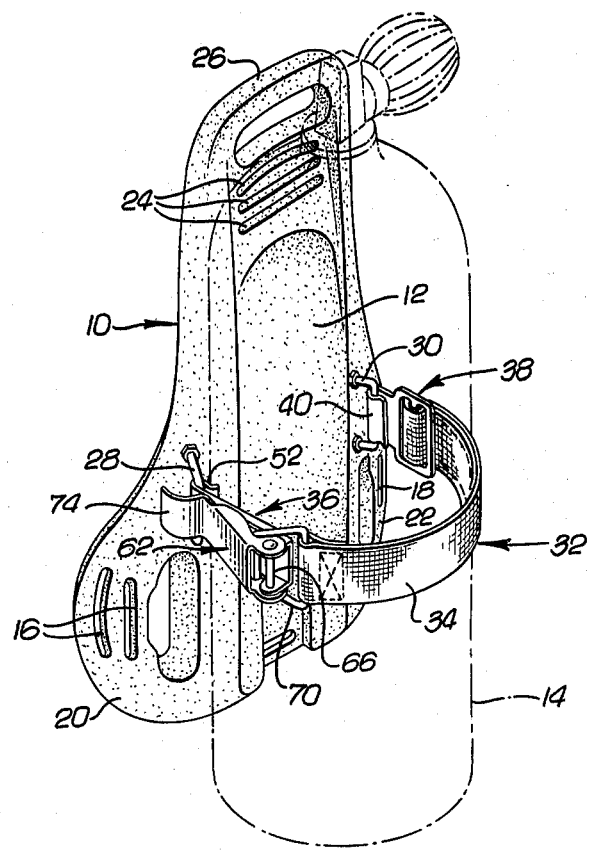
FIG. 1 is a perspective view of a harness incorporating the present invention, the tank itself being shown in phantom lines.

The following detailed description is of the best presently contemplated mode of carrying out the invention. This description is not to be taken in a limiting sense, but is made merely for purposes of illustrating the general principles of the invention, since the scope of the invention is best defined by the appended claims.

A back plate 10 made of molded plastic or the like provides an elongated seat 12 for a compresed air tank 14. The back plate 10 provides the usual slots or holes 16 and 18 at the side wings 20 and 22, and slots or holes 24 at the top 26 for connection to the usual fabric webbing (not shown) for attachment to the diver's back.

At opposite sides of the tank seat, U-shaped brackets 28 and 30 are fixedly attached, as by screws, nuts and stop washers, cooperable with threaded ends (not shown) of the brackets. These brackets provide loops for detachable connection of a webbing assembly 32 that, with the back plate, is designed to encircle the tank 14.

The webbing assembly comprises an inelastic web 34 preferably made of fabric material such as woven nylon belting about two or three inches wide. Other materials could be used. Coupling elements in the form of correspondingly wide hooks 36 and 38 are attached to opposite ends of the web 34 for connection to the brackets 28 and 30. Obviously, hooks could be substituted for the brackets 28 and 30, and companion loop or bar parts substituted for hooks 36 and 38.

The hook 38 is preferably made as a steel plate stamped and bent to provide a wide barb 40 for snagging the bracket 30. The end of the barb 40 is located on the inside so that it is shielded by the main body of the hook 38. The hook 38 provides two parallel slots 42 and 44 that together define a buckle bar 46 about which the web 34 is looped. The end of the web 34 is first projected from the outside of the hook through the inner slot 42, then is extended around the buckle bar 46, then is extended back through the outer slot 44, and then is doubled back along the inside of the web. The wrap around effect securely locks the web 34 in place. Alternatively, the end of the web could be projected from the inside of the hook through the inner slot 42, then looped around the buckle bar 46, then back through slot 44 to double back along the outside of the web. Such an arrangement shields the tank from the otherwise exposed edge of the hook.

Figure 2:
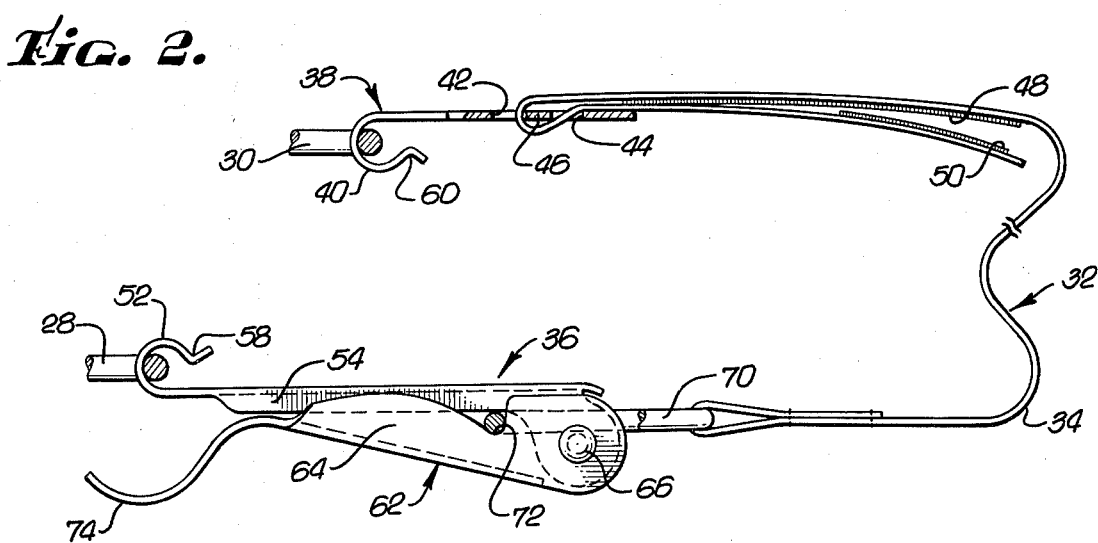
FIG. 2 is a side edge view of a webbing assembly shown with the tank removed, but the toggle mechanism in locked position as if circumferential tension were imposed on the web. The returned end of the web is peeled back for illustrative purposes. Part of one hook is broken away and shown in section.

To ensure against any change in the adjusted position of the web as a result of the very high circumferential stresses, a plastic hook and mesh fastener structure 48, 50 such as "VELCRO" is provided. The hook part 50 of the fastener structure is in the form of a pad (FIG. 2) sewn or otherwise secured to the returned end of the web so as to face the inside. The companion mesh part 48 of the fastener is in the form of a pad sewn or otherwise secured to the inside of the web to face the companion hook part 50. A length of the web 34 between the companion fastener parts 48 and 50 is several inches long and cooperates with the buckle bar 46. The position of the web can be adjusted to the exact requirement of the system in a manner to be hereinafter described.

The opposite hook 36 is formed as a toggle bar. Like the hook 38, the hook 36 or toggle bar is made as a steel plate stamped and bent to provde a barb end 52 that detachably engages the back plate bracket 28. The hook or toggle bar 36 provides side reinforcing flanges 54 that strengthen the toggle bar and define a general channel shape to the hook. The barb ends of both hooks 36 and 38 may have intermediate indentations 58 and 60 that very slightly restrict access of the brackets 28 and 30 to form very light releasable latches therefor.

A toggle lever 62 normally overlies the toggle bar 36. It too may be made of steel stamped and bent to suitable configuration. The toggle lever 62 has a channel like configuration defined by side flanges 64 that fit over the flanges 54 of the companion toggle bar 36. The toggle lever 62 is pivotally connected to the toggle bar by a pin 66 that passes through the side flanges of the parts. The pin 66 locates the pivot axis at the end of the hook or toggle bar 36 remote from the barb 52.

The toggle lever 62 serves as a link between the web 34 and the toggle bar or hook 36. For this purpose, the end of the web 34 opposite the hook 38 carries a four-sided loop 70 made of rigid steel. The web is extended through the loop 70, returned to the inside and sewn in place, thereby permanently to affix the loop.

The toggle lever 62 may be angularly moved rearwardly from the position shown so that the loop 70 can be passed over the distal end of the toggle lever 62. The toggle lever 64 has slots 72 in its side flanges that together provide a seat for the free side of the loop 70. The seat 72 is positioned to provide over center or toggle action. Thus, after the loop 70 is seated, the toggle lever 62 is moved angularly to the closed position illustrated. Just before the toggle lever 62 arrives at the closed position, the center of the loop side in the slots 64 is just in line with the axis of the pin 66 and the bracket 28, at which point, by suitable adjustment of operative web length, substantial stress is developed in the web. Further closing movement of the toggle lever 62 causes the loop side to move over center to a stable locked position limited by engagement of the toggle lever 62 with the toggle bar 54. Such movement positively secures the tank to the back plate 10.

By a simple trial and error method, the position of the hook and mesh fasteners and the hook 38 can be adjusted to achieve the requisite fit between the webbing assembly 32 and the tank. Release of the toggle is achieved simply by moving the toggle lever 62 to open. A curved end 74 of the toggle lever 62 forms a space for insertion of a thumb accessible at the closed position for application of force to open the toggle mechanism. The toggle mechanism is located close to the back plate 10 so that the thumb piece 74 cannot accidentally snag marine plants, rocks or auxiliary equipment.

The slots 72 for the loop 70 is located quite close to the axis of the hinge pin 66 such that a relatively high mechanical advantage is provided for the toggle lever. Accordingly, very little effort is required to close and open the toggle mechanism notwithstanding the fact that high circumferential stresses may be involved. In the present example, the mechanical advantage is approximately four to one. The over center movement of the loop 70 is very slight such that the force required to release the toggle mechanism is correspondingly small. The toggle mechanism is nevertheless stable in its locked position, because the web material is inelastic and preferably of such characteristic as to shrink upon exposure to water.

A very reliable mechanism is provided for firm attachment of the air tank to the back plate 10. The stability achieved equals that of steel bands. Yet, the flexible nature of the webbing assembly greatly reduces the bulk of the entire harness for storage purposes. Unlike a stiff metal band, the web 34, flexible as it is, presents no danger of cutting. It is easily handled.

Intending to claim all novel, useful and unobvious features shown or described, I make the following claims:

1. A harness for a scuba diver to enable the diver to carry a generally cylindrical tank of compressed air:
   (a) a relatively rigid back plate having protrusions for it to be carried at the back of the diver;
   (b) said back plate having a seat formed therein for the air tank;
   (c) a pair of brackets on opposite sides of the seat;
   (d) a flexible webbing assembly cooperable at opposite ends with said brackets to firmly hold said air tank in its seat;
   (e) said webbing assembly including a web made of flexible substantially inelastic fabric material;
   (f) said webbing assembly including a first hook detachably cooperable with one of said brackets, said first hook having means forming a buckle bar around which one end of said web is wound and returned along the inside of the web;
   (g) flexible hook and mesh fastener elements attached, respectively, to the returned end of said web and the inside facing part of said web for supplementing the holding power of the buckle bar whereby the operative length of said web is positively determined;
   (h) said webbing assembly also including a rigid loop fixedly carried at the opposite end of the web;
   (i) said webbing assembly also including a second hook detachably cooperable with the other of said brackets, said second hook comprising a toggle bar;
   (j) said webbing assembly also including a toggle lever pivotally mounted on the outer side of said toggle bar for movement about an axis located remote from the corresponding bracket, said toggle lever upon angular movement to an open position away from said toggle bar being movable through said rigid loop, said toggle bar having recess means to engage and pick up said rigid loop for toggle connection to said toggle bar upon movement of said toggle lever to closed position;

(k) said toggle bar and said toggle lever each comprising a longitudinally extending strip, each strip having a pair of longitudinally extending side flanges, the side flanges of the toggle lever overlying and substantially shielding the side flanges of said toggle bar when said toggle lever is in closed position, said recess means being formed in the side flanges of said toggle lever.

2. The combination as set forth in claim 1 in which the distal end of said toggle lever has a thumb piece accessible for insertion of the thumb of the operator for exertion of opening force on said toggle lever, said thumb piece being located close to the corresponding bracket and back plate to avoid snagging lines, marine growth or the like.

* * * * *